Sept. 29, 1936.  J. HEKTNER  2,055,532

WATER EXCLUDING RING FOR AXLE BEARINGS

Filed Oct. 10, 1934

INVENTOR:
Joel Hektner,
by Cantlan & Gravely,
HIS ATTORNEYS.

Patented Sept. 29, 1936

2,055,532

UNITED STATES PATENT OFFICE 2,055,532

WATER EXCLUDING RING FOR AXLE BEARINGS

Joel Hektner, Canton, Ohio, assignor to The Timken Roller Bearing Company, Canton, Ohio, a corporation of Ohio Application October 10, 1934, Serial No. 747,684

1 Claim. (Cl. 286—7)

My invention relates to closures for axle bearings, particularly to rings for excluding water from the axle bearings of locomotives, tenders and other vehicles that are used under conditions where the exclusion of water is a special problem.

The invention has for its principal object a simple and effective means for excluding water from such bearings.

The invention consists principally in a ring mounted on a closure plate so as to be slidable longitudinally thereof, whereby it can be accurately positioned with respect to a wheel or other member located alongside said bearing closure, thereby forming a water seal. The invention further consists in the water excluding ring for axle bearings and in the parts and combinations and arrangements of parts hereinafter described and claimed.

Figure 1:
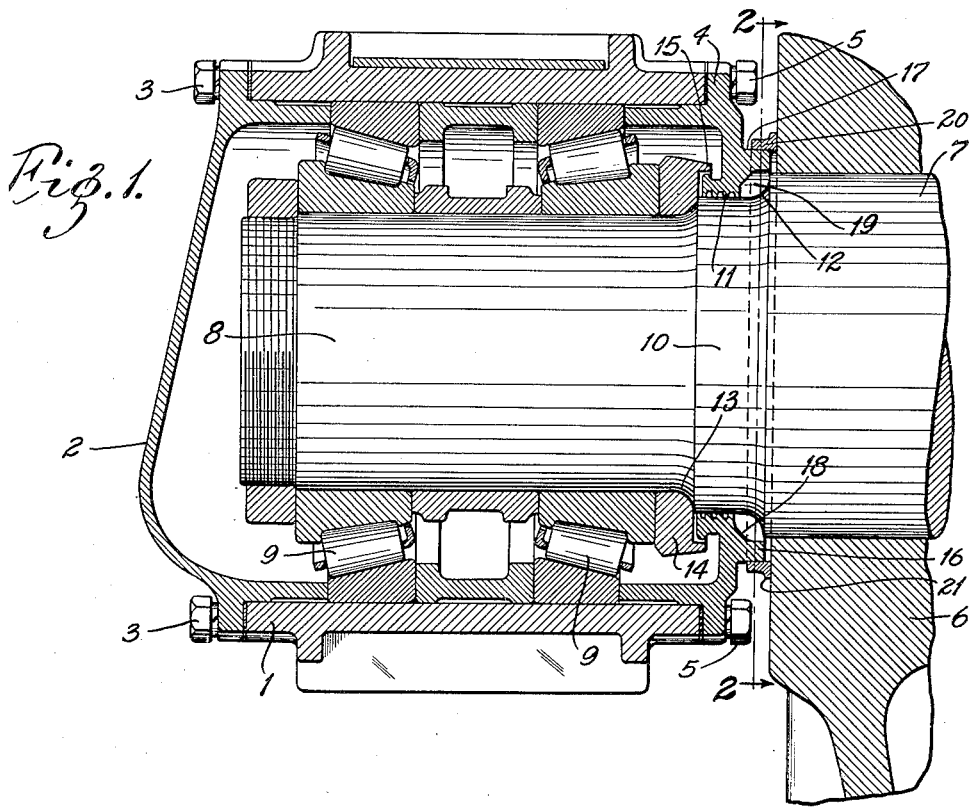
Figure 2:
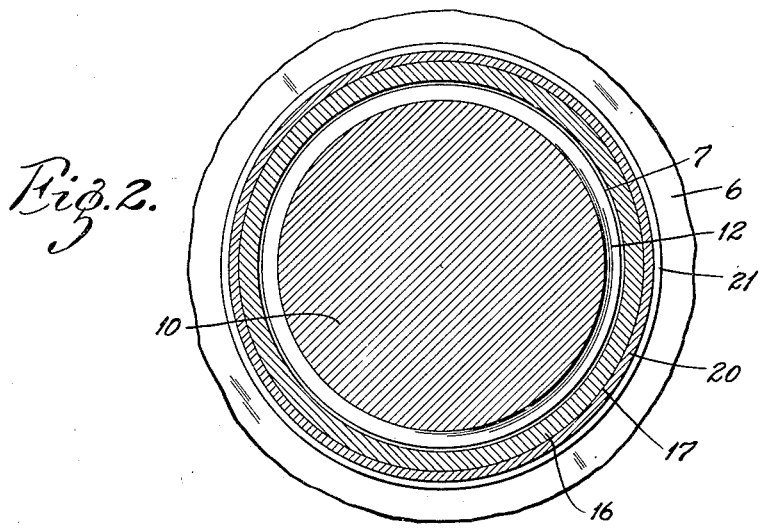

In the accompanying drawing, wherein like symbols refer to like parts wherever they occur, Fig. 1 is a longitudinal sectional view of a roller bearing axle construction provided with a water excluding ring embodying my invention; and Fig. 2 is a sectional view on the line 2—2 in Fig. 1.

The accompanying drawing shows the axle bearings and journal box of a locomotive trailer truck, the details of the bearings and journal box forming no part of the present invention, which is concerned entirely with the closure device for the end of the journal box. The journal box 1 illustrated has a cap 2 closing its outer end and secured thereto by screws 3 and an annular plate 4 closing its inner end and secured thereto by screws 5. A wheel 6 is mounted on the body 7 of the axle which has a reduced end portion 8 extending into the journal box 1 and on which taper roller bearings 9 are mounted, and an intermediate stepped portion 10 which cooperates with the grooved closure sleeve 11 of the end closure plate 4. A radiused shoulder 12 is formed between said body portion 7 and said intermediate stepped portion 10 and a reduced shoulder 13 is formed between said intermediate stepped portion 10 and the reduced end portion 8. A bearing abutment collar 14 mounted on said reduced end portion 8 against said shoulder 13 has a projecting flange 15 or flinger that overlaps the inner end of said grooved sleeve 11.

The closure plate 4 has a tubular portion 16 that projects towards said wheel 6 and has a cylindrical outer periphery 17. A tapering inner portion 18 of said plate 4 extends from said tubular portion 16 to the grooved sleeve 11. A space 19 is necessarily left between said tapered portion 18 and said radiused portion 12 of the axle. While the seal made by the sleeve 11 is effective under ordinary circumstances, the amount of water that can be excluded is limited; and, under certain circumstances, it becomes desirable to provide a positive means for excluding water from said space.

According to the present invention, a ring 20 or collar has a cylindrical inner periphery fitting over the cylindrical seat formed by the outer periphery of said tubular portion 16 and is preferably provided with a flanged or outwardly flaring end portion 21 whose face abuts against the hub end of the wheel 6. Said ring 20 has a fairly tight fit on said seat 16, but it may be moved by a pinch bar or other suitable tool so that its face engages the wheel hub. This arrangement prevents water from entering the space between the end closure plate 4 and the radiused shoulder 12 on the axle. The length of the ring 20 is somewhat less than the length of said seat 16; so that when it is desired to remove the wheel and bearing assembly, the endwise movement of the wheel will push said ring 20 onto the seat 16 until the end of said ring is flush with the end face of said seat, after which the thrust will be transmitted through the closure plate 4 to the bearings and journal box, which will then be removed in the usual way.

The above described ring can be adjusted to whatever position will fill the gap between the wheel hub and the closure ring of the journal box, which gap varies in size due to different wheel hubs being in different positions. It forms an effective seal against the admission of water and other matter, it requires very little modification in the design of a well known type of end closure member, it does not interfere with the removal of the wheel and bearings and it is simple and economical to apply. Obviously, numerous changes may be made without departing from the invention and I do not wish to be limited to the precise construction shown.

What I claim is:

A water excluding seal for axle bearings of the type mounted in a housing disposed adjacent to a wheel hub and having an end closure plate with a sleeve encircling a portion of said axle, which comprises a cylindrical seat on said closure plate extending towards said wheel and a ring mounted on said seat with its end face in engagement with said wheel, said ring being shorter than said seat and having a fit on said seat permitting adjustment by force but tight enough that it will remain in adjusted position.

JOEL HEKTNER.